United States Patent
Chen et al.

(10) Patent No.: US 10,671,776 B2
(45) Date of Patent: *Jun. 2, 2020

(54) COMPUTER SIMULATION OF PHYSICAL PROCESSES INCLUDING MODELING OF LAMINAR-TO-TURBULENT TRANSITION

(71) Applicant: Dassault Systemes Simulia Corp., Johnston, RI (US)

(72) Inventors: Hudong Chen, Newton, MA (US); Rupesh Kotapati, Lowell, MA (US); Raoyang Zhang, Burlington, MA (US); Richard Shock, Winchester, MA (US); Ilya Staroselsky, Lincoln, MA (US); Yanbing Li, Westford, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 602 days.

This patent is subject to a terminal disclaimer.

(21) Appl. No.: 15/363,958

(22) Filed: Nov. 29, 2016

(65) Prior Publication Data

US 2017/0109464 A1    Apr. 20, 2017

Related U.S. Application Data

(63) Continuation of application No. 13/675,329, filed on Nov. 13, 2012, now Pat. No. 9,542,506.

(51) Int. Cl.
*G06F 30/23*    (2020.01)
*G06F 30/20*    (2020.01)
*G06F 17/11*    (2006.01)
*G06F 111/10*    (2020.01)

(52) U.S. Cl.
CPC .............. *G06F 30/23* (2020.01); *G06F 17/11* (2013.01); *G06F 30/20* (2020.01); *G06F 2111/10* (2020.01)

(58) Field of Classification Search
CPC .. G06F 17/5009; G06F 2217/16; G06F 30/23; G06F 30/20; G06F 17/11; G06F 2111/10
USPC .......................................................... 703/9
See application file for complete search history.

(56) References Cited

U.S. PATENT DOCUMENTS

| | | |
|---|---|---|
| 5,964,433 A | 10/1999 | Nosenchuck |
| 2012/0173219 A1 | 7/2012 | Rodriguez et al. |
| 2012/0232860 A1 | 9/2012 | Rodriguez et al. |
| 2012/0245903 A1 | 9/2012 | Sturdza |
| 2012/0245910 A1 | 9/2012 | Rajnaryan et al. |
| 2012/0265511 A1 | 10/2012 | Shan et al. |
| 2014/0136159 A1 | 5/2014 | Chen et al. |

OTHER PUBLICATIONS

Bermejo-Moreno, I., et al., "Wall-modeled large eddy simulation of shock/turbulent boundary-layer interaction in a duct," Center for Turbulence Research, Annual Research Briefs, 2011, pp. 49-62.

(Continued)

*Primary Examiner* — Eunhee Kim
(74) *Attorney, Agent, or Firm* — Fish & Richardson P.C.

(57) ABSTRACT

A computer-implemented method for simulating fluid flow using a lattice Boltzmann (LB) approach that includes assigning values for the wall shear stress on a per-facet (e.g., per-surfel) basis based on whether the fluid flow is laminar or turbulent is described herein.

20 Claims, 9 Drawing Sheets

(56) References Cited

OTHER PUBLICATIONS

Bodart, J. et al., "Wall-modeled large eddy simulation in complex geometries with application to high-lift devices," Center for Turbulence Research, Annual Research Briefs, 2011, pp. 37-48.

Hickel, S., et al., "A parametrized non-equilibrium wall-model for large-eddy simulations," Center for Turbulence Research, Proceedings of the Summer Program, 2012, pp. 127-136.

Kawai, S., et al., "A dynamic wall model for large-eddy simulation of high Reynolds number compressible flows," Center for Turbulence Research, Annual Research Briefs, 2010, pp. 25-37.

Langtry, R.B., et al., "A Correlation-Based Transition Model Using Local Variables—Part II—Test Cases and Industrial Applications." Proceedings of ASME Turbo Expo 2004, Power for Land, Sea, and Air, Jun. 14-17, 2004, Vienna Austria, pp. 69-79.

Langtry, R.B., et al., "Transition Modeling for General CFD Applications in Aeronautics." AIAA, 2005, pp. 1-14.

Larsson, J., et al., "Wall-modeling in large eddy simulation: length scales, grid resolution and accuracy,"Center for Turbulence Research, Annual Research Briefs, 2010, pp. 39-46.

Menter, F.R., et al., "A Correlation-Based Transition Model Using Local Variables—Part I—Model Formulation." Proceedings of ASME Turbo Expo 2004, Power for Land, Sea, and Air, Jun. 14-17, 2004, Vienna, Austria, pp. 57-67.

Menter, F.R., et al., "Transition Modelling Based on Local Variables." Engineering Turbulence Modelling and Experiments—5, 2002, pp. 555-564.

Van Treeck et al.; "Extension of a Hybrid Thermal LBE Scheme for Large-eddy Simulations of Turbulent convective Flows"; Elsevier Ltd. Computers & Fluids 35 (2006) 863-871.

Wallace et al.; "Boundary Layer Turbulence in Transitional and Developed States"; Center for Turbulence Research, Proceedings of the Summer Program 2010; pp. 77-86.

Erdem; "Active Flow control Studies at MACH 5: Measurement and Computation"; School of Mechanical, Aerospace and Civil Engineering, 2001; p. 1-233.

Bodart et al.; Sensor-based computation of transitional flows using wall-modeled large eddy simulation; Center for Turbulence Research, Annual Research Briefs 2012; pp. 229-240.

International Search Report; PCT/US2013/063241; dated Mar. 2014; 3 pp.

Written Opinion; PCT/US2013/063241; dated Mar. 2014; 11 pp.

Arnal; et al., "Laminar-Turbulent Transition and Shock Wave/ Boundary Layer Interaction", RTO-EN-AVT-116; 2004; 46 pp.

European Search Report; EP Application No. 13854830.0; dated Jul. 18, 2016; 6 pp.

Prosecution File History of U.S. Appl. No. 13/675,329, retrieved on Jan. 9, 2017.

COMPUTER SIMULATION OF PHYSICAL PROCESSES INCLUDING MODELING OF LAMINAR-TO-TURBULENT TRANSITION

PRIORITY CLAIM UNDER 35 USC 119(e)

This application is a continuation of and claims benefit to U.S. application Ser. No. 13/675,329, filed on Nov. 13, 2012 now U.S. Pat. No. 9,542,506. The application is incorporated by reference in its entirety.

TECHNICAL FIELD

This description relates to computer simulation of physical processes, such as fluid flow and acoustics. This description also relates to a method for predicting the phenomena of laminar-to-turbulent transition in boundary layers.

BACKGROUND

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

SUMMARY

This description also relates to a method for predicting the phenomena of laminar-to-turbulent transition in boundary layers. This description also relates to a method of selecting an appropriate wall-shear stress value for regions (e.g., facets, surfels) on the surface based on the predicted laminar-to-turbulent transition and using the selected wall-shear stress value for simulation of the fluid flow.

In general, this document describes techniques for simulating fluid flow using a lattice Boltzmann (LB) approach and for solving scalar transport equations. In the approaches described herein, a method for simulating a fluid flow that includes a laminar to turbulent boundary layer transition on a computer includes performing a first calculation for a laminar boundary layer flow and performing a second calculation for a turbulent boundary layer flow. The method also includes comparing a result from at least one of the first and second boundary layer calculations to a criterion, selecting, for at least some of multiple elements representing at least one of a surface and a fluid near the surface, the results of the first calculation for a laminar boundary layer flow or the results of the second calculation for a turbulent boundary layer flow based on a result of the comparison, and simulating activity of a fluid in a volume, the activity of the fluid in the volume being simulated so as to model movement of elements within the volume, the simulation being based in part on the selected results for the multiple elements.

Embodiments can include one or more of the following.

Performing the first calculation for the laminar boundary layer flow can include calculating a wall momentum flux tensor property for the laminar flow, performing the second calculation for the turbulent boundary layer flow can include calculating a wall momentum flux tensor property for the turbulent flow and selecting, for at least some of multiple elements the results of the first boundary layer calculation or the results of the second calculation for a turbulent boundary layer flow can include selecting the laminar wall momentum flux tensor property or the turbulent wall momentum flux tensor property.

Determining the laminar-to-turbulent transition for the boundary layer can include determining, for each of multiple facets on the surface, a first measure based on the first boundary layer calculation and a second measure based on the second boundary layer calculation and classifying the flow for at least some of the multiple facets as laminar or turbulent by comparing at least one of the first and second measures to the criterion.

Selecting, for at least some of the multiple facets on the surface, the results of the first calculation for the laminar boundary layer flow or the results of the second calculation for the turbulent boundary layer flow can include for facets classified as laminar, selecting a wall momentum flux tensor property for the laminar flow and for facets classified as turbulent, selecting a wall momentum flux tensor property for the turbulent flow.

The result of the first boundary layer calculation can include a measure of laminar wall momentum flux tensor, the result of the second boundary layer calculation can include a measure of turbulent wall momentum flux tensor and the comparison can include a measure of turbulence intensity.

Performing a first boundary layer calculation can include calculating, for each of multiple facets on the surface, a measure of laminar wall momentum flux tensor and performing the second boundary layer calculation can include calculating, for each of multiple facets on the surface, a measure of turbulent wall momentum flux tensor using the second boundary layer calculation. Comparing the result from at least one of the first and second boundary layer calculations to the criterion can include comparing, for each of the multiple facets on the surface, a calculated measure of turbulence intensity and the measure of turbulent wall momentum flux tensor and selecting the results of the first boundary layer calculation or the results of the second boundary layer can include selecting, for at least some of the multiple facets on the surface, one of the calculated turbulent wall momentum flux tensor property and laminar wall momentum flux tensor property based on the comparison of the measure of turbulence intensity and the measure of turbulent wall momentum flux tensor.

Comparing, for each of the multiple facets on the surface, the measure of turbulence intensity and the measure of turbulent wall momentum flux tensor can include determining if the measure of turbulence intensity is greater than the measure of wall momentum flux tensor and selecting, for at least some of the multiple facets on the surface, one of the calculated turbulent wall momentum flux tensor and laminar wall momentum flux tensor, and can include, for a particular facet, selecting the turbulent wall momentum flux tensor if the measure of turbulence intensity is greater than the measure of turbulent wall momentum flux tensor and selecting the measure of laminar wall momentum flux tensor if the measure of turbulence intensity is less than the measure of turbulent wall momentum flux tensor.

Calculating the measure of local turbulence intensity can include calculating a value of local turbulent kinetic energy.

For a given near-wall fluid velocity the measure of turbulent wall momentum flux tensor can be greater than the measure of laminar wall momentum flux tensor.

Simulating activity of the fluid in the volume can include performing interaction operations on the state vectors, the interaction operations modeling interactions between elements of different momentum states according to a model and performing first move operations of the set of state vectors to reflect movement of elements to new voxels in the volume according to the model.

The second boundary layer calculation can include a calculation to determine a measure of turbulent wall momentum flux tensor based on a velocity profile and a distance from the wall.

The method can also include selecting, for at least some of the multiple facets on the surface, a value that is based on a combination of the results of the first calculation for the laminar boundary layer flow and the results of the second calculation for the turbulent boundary layer flow.

The method can also include selecting, for at least some of the multiple facets on the surface, a wall momentum flux tensor property that is based on a combination of the turbulent wall momentum flux tensor property and laminar wall momentum flux tensor property.

The second boundary layer calculation can include a calculation to determine a measure of turbulent wall momentum flux tensor based on local turbulent kinetic energy and a local fluid velocity.

The voxel size in a region adjacent to the surface can be similar to a voxel size at regions spaced apart from the surface.

The voxel size in a region adjacent to the surface can be the same as a voxel size at regions spaced apart from the surface.

In some aspects, a computer program product tangibly embodied in a computer readable medium can include instructions that, when executed, simulate a physical process fluid flow that includes a laminar to turbulent boundary layer transition. The computer program product can be configured to cause a computer to perform a first calculation for a laminar boundary layer flow, perform a second calculation for a turbulent boundary layer flow, compare a result from at least one of the first and second boundary layer calculations to a criterion, select, for at least some of multiple elements representing at least one of a surface and a fluid near the surface, the results of the first calculation for a laminar boundary layer flow or the results of the second calculation for a turbulent boundary layer flow based on a result of the comparison, and simulate activity of a fluid in a volume, the activity of the fluid in the volume being simulated so as to model movement of elements within the volume, the simulation being based in part on the selected results for the multiple elements.

Embodiments can include one or more of the following.

The instructions to perform the first calculation for the laminar boundary layer flow can include instructions to calculate a wall momentum flux tensor property for the laminar flow, the instructions to perform the second calculation for the turbulent boundary layer flow can include instructions to calculate a wall momentum flux tensor property for the turbulent flow, and the instructions to select the results of the first boundary layer calculation or the results of the second calculation for a turbulent boundary layer flow can include instructions to select the laminar wall momentum flux tensor property or the turbulent wall momentum flux tensor property.

The instructions to determine the laminar-to-turbulent transition for the boundary layer can include instructions to determine, for each of multiple facets on the surface, a first measure based on the first boundary layer calculation and a second measure based on the second boundary layer calculation and classify the flow for at least some of the multiple facets as laminar or turbulent by comparing at least one of the first and second measures to the criterion.

The instructions for selecting, for at least some of the multiple facets on the surface, the results of the first calculation for the laminar boundary layer flow or the results of the second calculation for the turbulent boundary layer flow can include for facets classified as laminar, instructions to select a wall momentum flux tensor property for the laminar flow and for facets classified as turbulent, instructions to select a wall momentum flux tensor property for the turbulent flow.

The result of the first boundary layer calculation can include a measure of laminar wall momentum flux tensor property, the result of the second boundary layer calculation can include a measure of turbulent wall momentum flux tensor property, and the criterion can include a measure of turbulence intensity.

The instruction to perform the first boundary layer calculation can include instructions to calculate, for each of multiple facets on the surface, a measure of laminar wall momentum flux tensor and the instructions to perform the second boundary layer calculation can include instructions to calculate, for each of multiple facets on the surface, a measure of turbulent wall momentum flux tensor using the second boundary layer calculation and the instructions to compare the result from at least one of the first and second boundary layer calculations to the criterion can include instructions to compare, for each of the multiple facets on the surface, a calculated measure of turbulence intensity and the measure of turbulent wall momentum flux tensor, and the instructions to select the results of the first boundary layer calculation or the results of the second boundary layer can include instructions to select, for at least some of the multiple facets on the surface, one of the calculated turbulent wall momentum flux tensor and laminar wall momentum flux tensor properties based on the comparison of the measure of turbulence intensity and the measure of turbulent wall momentum flux tensor.

In some additional aspects, a system for simulating a physical process fluid flow, can be configured to perform a first calculation for a laminar boundary layer flow, perform a second calculation for a turbulent boundary layer flow, compare a result from at least one of the first and second boundary layer calculations to a criterion, select, for at least some of multiple elements representing at least one of a surface and a fluid near the surface, the results of the first calculation for a laminar boundary layer flow or the results of the second calculation for a turbulent boundary layer flow based on a result of the comparison, and simulate activity of a fluid in a volume, the activity of the fluid in the volume being simulated so as to model movement of elements within the volume, the simulation being based in part on the selected results for the multiple elements.

Embodiments can include one or more of the following.

The configurations to perform the first calculation for the laminar boundary layer flow can include configurations to calculate a wall momentum flux tensor property for the laminar flow. The configurations to perform the second calculation for the turbulent boundary layer flow can include configurations to calculate a wall momentum flux tensor property for the turbulent flow. The configurations to select the results of the first boundary layer calculation or the results of the second calculation for a turbulent boundary layer flow can include configurations to select the laminar wall momentum flux tensor property or the turbulent wall momentum flux tensor property.

The configurations to determine the laminar-to-turbulent transition for the boundary layer can include configurations to determine, for each of multiple facets on the surface, a first measure based on the first boundary layer calculation and a second measure based on the second boundary layer calculation and classify the flow for at least some of the multiple facets as laminar or turbulent by comparing at least one of the first and second measures to the criterion.

The configurations for selecting, for at least some of the multiple facets on the surface, the results of the first calculation for the laminar boundary layer flow or the results of the second calculation for the turbulent boundary layer flow can include instructions to, for facets classified as laminar, select a wall momentum flux tensor property value for the laminar flow and for facets classified as turbulent, instructions to select a wall momentum flux tensor property for the turbulent flow.

The result of the first boundary layer calculation can include a measure of laminar wall momentum flux tensor, the result of the second boundary layer calculation can include a measure of wall momentum flux tensor and the comparison comprises a measure of turbulence intensity.

The configurations to perform the first boundary layer calculation can include configurations to calculate, for each of multiple facets on the surface, a measure of laminar wall momentum flux tensor and the configuration to perform the second boundary layer calculation can include configurations to calculate, for each of multiple facets on the surface, a measure of turbulent wall momentum flux tensor using the second boundary layer calculation. The configurations to compare the result from at least one of the first and second boundary layer calculations to the criterion can include configurations to compare, for each of the multiple facets on the surface, a calculated measure of turbulence intensity and the measure of turbulent wall momentum flux tensor. The configurations to select the results of the first boundary layer calculation or the results of the second boundary layer can include configurations to select, for at least some of the multiple facets on the surface, one of the calculated turbulent wall momentum flux tensor and laminar wall momentum flux tensor properties based on the comparison of the measure of turbulence intensity and the measure of wall momentum flux tensor.

Boltzmann-Level Mesoscopic Representation

It is well known in statistical physics that fluid systems can be represented by kinetic equations on the so-called "mesoscopic" level. On this level, the detailed motion of individual particles need not be determined. Instead, properties of a fluid are represented by the particle distribution functions defined using a single particle phase space, $f=f(x, v, t)$, where x is the spatial coordinate while v is the particle velocity coordinate. The typical hydrodynamic quantities, such as mass, density, fluid velocity and temperature, are simple moments of the particle distribution function. The dynamics of the particle distribution functions obeys a Boltzmann equation:

$$\partial_t f + v \nabla_x f + F(x,t) \nabla_v f = C\{f\}, \quad \text{Eq.(1)}$$

where F(x, t) represents an external or self-consistently generated body-force at (x, t). The collision term C represents interactions of particles of various velocities and locations. It is important to stress that, without specifying a particular form for the collision term C, the above Boltzmann equation is applicable to all fluid systems, and not just to the well-known situation of rarefied gases (as originally constructed by Boltzmann).

Generally speaking, C includes a complicated multi-dimensional integral of two-point correlation functions. For the purpose of forming a closed system with distribution functions $f$ alone as well as for efficient computational purposes, one of the most convenient and physically consistent forms is the well-known BGK operator. The BGK operator is constructed according to the physical argument that, no matter what the details of the collisions, the distribution function approaches a well-defined local equilibrium given by $\{f_{eq}(x,v,t)\}$ via collisions:

$$C = -\frac{1}{\tau}(f - f^{eq}), \quad \text{Eq. (2)}$$

where the parameter τ represents a characteristic relaxation time to equilibrium via collisions. Dealing with particles (e.g., atoms or molecules) the relaxation time is typically taken as a constant. In a "hybrid" (hydro-kinetic) representation, this relaxation time is a function of hydrodynamic variables like rate of strain, turbulent kinetic energy and others. Thus, a turbulent flow may be represented as a gas of turbulence particles ("eddies") with the locally determined characteristic properties.

Numerical solution of the Boltzmann-BGK equation has several computational advantages over the solution of the Navier-Stokes equations. First, it may be immediately recognized that there are no complicated nonlinear terms or higher order spatial derivatives in the equation, and thus there is little issue concerning advection instability. At this level of description, the equation is local since there is no need to deal with pressure, which offers considerable advantages for algorithm parallelization. Another desirable feature of the linear advection operator, together with the fact that there is no diffusive operator with second order spatial derivatives, is its ease in realizing physical boundary conditions such as no-slip surface or slip-surface in a way that mimics how particles truly interact with solid surfaces in reality, rather than mathematical conditions for fluid partial differential equations ("PDEs"). One of the direct benefits is that there is no problem handling the movement of the interface on a solid surface, which helps to enable lattice-Boltzmann based simulation software to successfully simulate complex turbulent aerodynamics. In addition, certain physical properties from the boundary, such as finite roughness surfaces, can also be incorporated in the force. Furthermore, the BGK collision operator is purely local, while the calculation of the self-consistent body-force can be accomplished via near-neighbor information only. Consequently, computation of the Boltzmann-BGK equation can be effectively adapted for parallel processing.

Lattice Boltzmann Formulation

Solving the continuum Boltzmann equation represents a significant challenge in that it entails numerical evaluation of an integral-differential equation in position and velocity phase space. A great simplification took place when it was observed that not only the positions but the velocity phase space could be discretized, which resulted in an efficient numerical algorithm for solution of the Boltzmann equation. The hydrodynamic quantities can be written in terms of simple sums that at most depend on nearest neighbor information. Even though historically the formulation of the lattice Boltzmann equation was based on lattice gas models prescribing an evolution of particles on a discrete set of velocities $v(\in\{c_i, i=1, \ldots, b\})$, this equation can be systematically derived from the first principles as a discretization of the continuum Boltzmann equation. As a result, LBE does not suffer from the well-known problems associated with the lattice gas approach. Therefore, instead of dealing with the continuum distribution function in phase space, $f(x,v,t)$, it is only necessary to track a finite set of discrete distributions, $f_i(x,t)$ with the subscript labeling the discrete velocity indices. The key advantage of dealing with this kinetic equation instead of a macroscopic description is that the increased phase space of the system is offset by the locality of the problem.

Due to symmetry considerations, the set of velocity values are selected in such a way that they form certain lattice structures when spanned in the configuration space. The dynamics of such discrete systems obeys the LBE having the form $f_i(x+c_i,t+1)-f_i(x,t)=C_i(x,t)$, where the collision operator usually takes the BGK form as described above. By proper choices of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined as:

$$\rho(x, t) = \sum_i f_i(x, t); \quad \rho u(x, t) = \sum_i c_i f_i(x, t); \quad \text{Eq. (3)}$$
$$DT(x, t) = \sum_i (c_i - u)^2 f_i(x, t),$$

where $\rho$, $u$, and T are, respectively, the fluid density, velocity and temperature, and D is the dimension of the discretized velocity space (not at all equal to the physical space dimension).

Other features and advantages will be apparent from the following description, including the drawings, and the claims.

DESCRIPTION

A. Approach to Modeling Wall-Shear Stress

Figure 1:
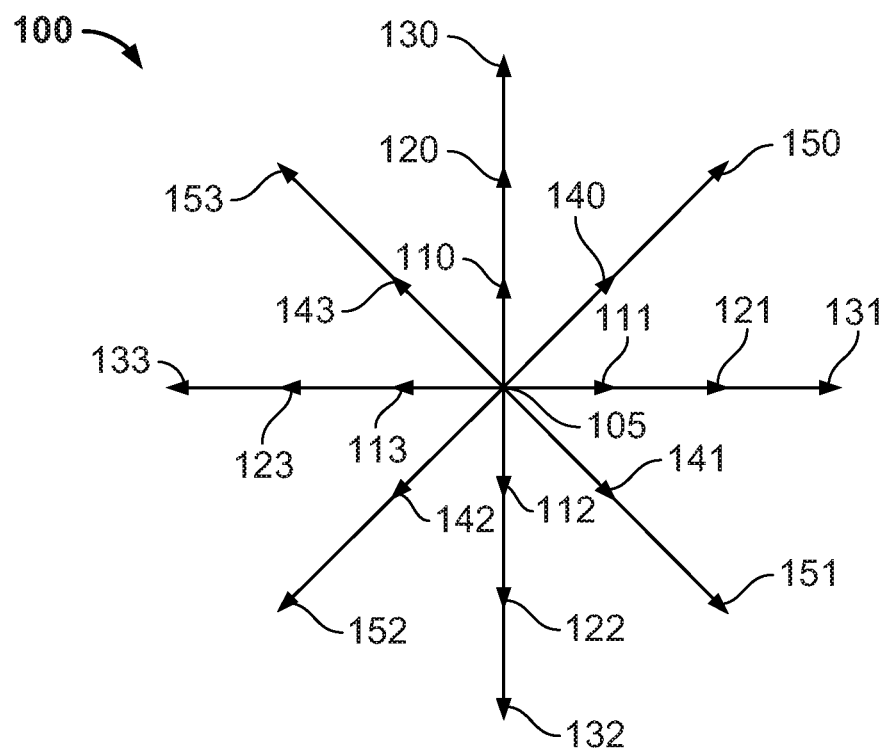
FIGS. 1 and 2 illustrate velocity components of two LBM models.

When completing complex fluid flow simulations it can be beneficial to take into account the differences in wall-shear stress between a laminar boundary layer flow and a turbulent boundary layer flow.

Application of the universal law of the wall is valid and reliable if the flow everywhere in the boundary layer is fully turbulent and if the boundary layer is developing under zero pressure gradient. However, this condition is not always satisfied in a high Reynolds number wall-bounded flow. Indeed, close to the leading edges of fluid dynamic devices, the developing boundary layer flow is often not fully turbulent but rather laminar which can affect resulting values of wall-shear stress. The consequence on predicting global flow properties like lift and drag can be substantial, especially for streamlined bodies. Therefore, described herein are methods and systems for identifying where (and when) the flow is laminar or turbulent over solid surfaces. By identifying where the flow is laminar, the model for wall-shear stress can properly and automatically account the laminar flow situations (e.g., by modifying a value for the skin friction/wall-shear stress at a particular location). More particularly, for every location on a surface, a calculation can be performed to determine whether the flow at the location is laminar or turbulent and the first value for the wall-shear stress can be used in the flow dynamics simulation if the flow at the location is laminar and the second, different value for the wall-shear stress can be used in the flow dynamics simulation if the flow at the location is turbulent. In the systems and methods described herein, a lattice Boltzmann boundary condition ensures the momentum flux (i.e., wall-shear stress) at the wall on arbitrary geometries, as long as the wall-shear stress value is prescribed. The systems and methods described herein include identifying, on a per facet/surfel basis, if the flow is turbulent or not based on a comparison of the turbulent kinetic energy level to the wall-shear stress value for the surface location: it is turbulent if the turbulent kinetic energy level is greater or equal to the wall-shear stress value, and is laminar if otherwise. Based on this determination of whether the flow is laminar or turbulent, the appropriate wall-shear stress value is located and applied to the surface location (e.g., a laminar wall-shear stress value is assigned to regions of laminar flow and a turbulent wall-shear stress value is applied to regions of turbulent flow).

This approach for modeling wall-shear stress may be used in conjunction with a time-explicit CFD/CAA solution method based on the Lattice Boltzmann Method (LBM), such as the PowerFLOW system available from Exa Corporation of Burlington, Mass. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A general discussion of a LBM-based simulation system is provided below and followed by a discussion of a scalar solving approach that may be used in conjunction with fluid flow simulations to support such a modeling approach.

B. Model Simulation Space

In a LBM-based physical process simulation system, fluid flow may be represented by the distribution function values $f_i$, evaluated at a set of discrete velocities $c_i$. The dynamics of the distribution function is governed by Equation 4 where $f_i(0)$ is known as the equilibrium distribution function, defined as:

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \qquad \text{Eq. (4)}$$

where $u_\alpha = \frac{c_i \hat{u}}{T}$.

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass ρ and fluid velocity u, are obtained as simple summations in Equation (3). Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring to FIG. 1, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
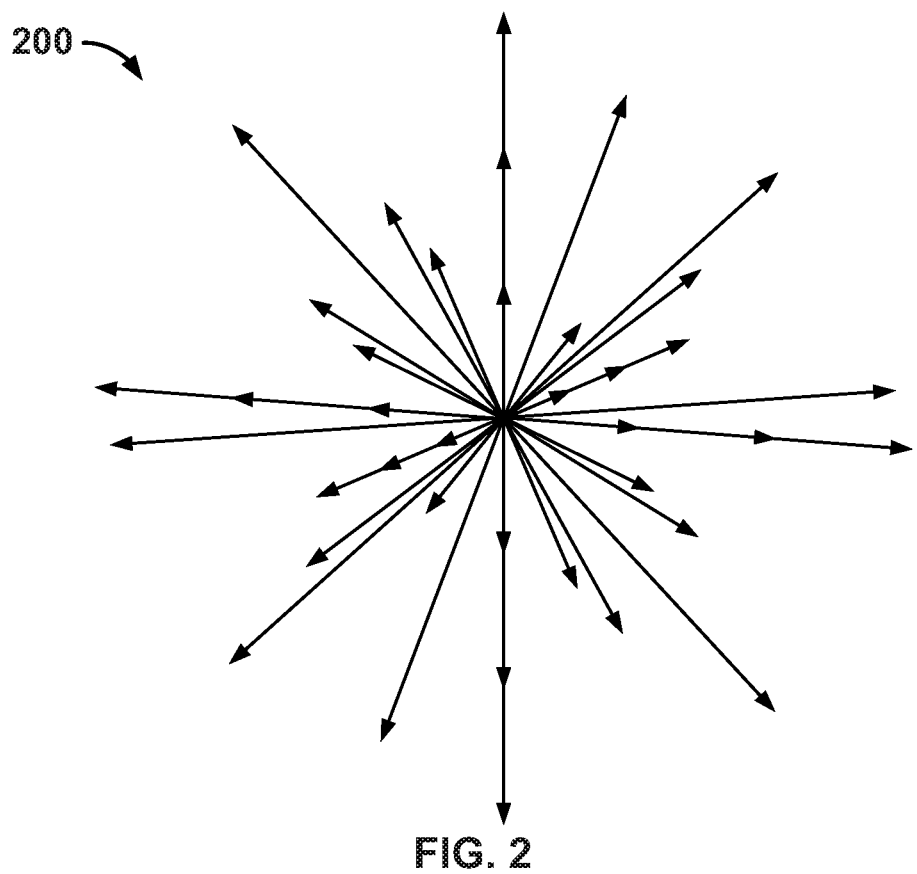

As also illustrated in FIG. 2, a second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 3:
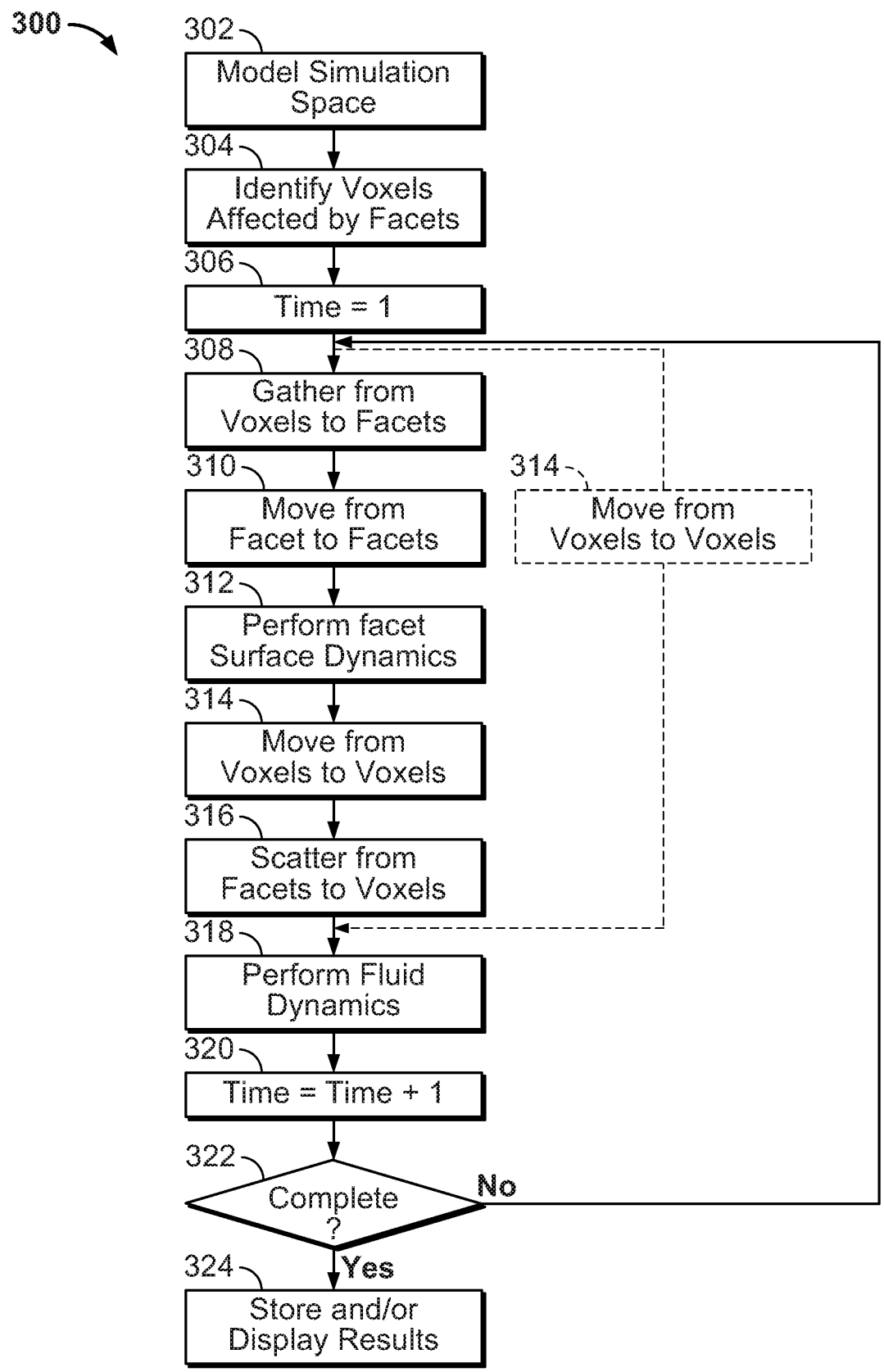
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v. \qquad \text{Eq.(5)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{i,x}, c_{i,y}, c_{i,z}). \qquad \text{Eq.(6)}$$

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
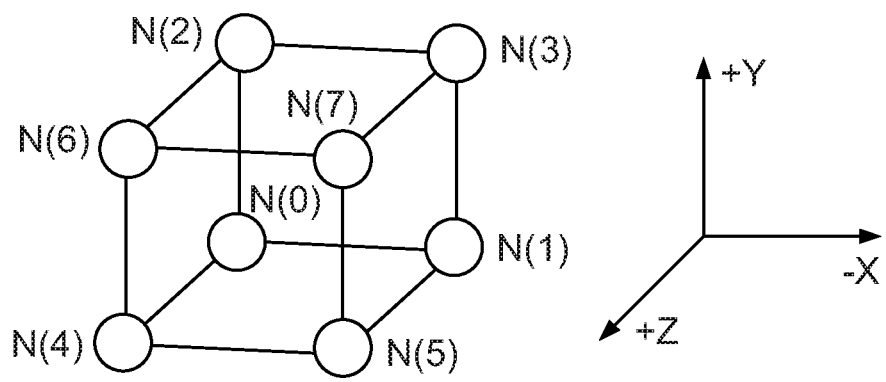
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$. A microblock is illustrated in FIG. 4.

Figure 5A:
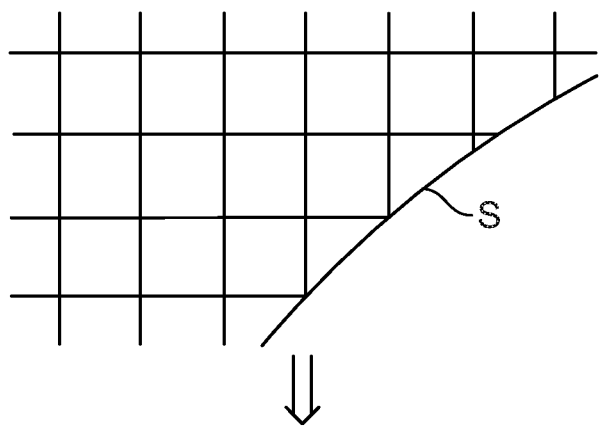
FIGS. 5A and 5B are illustrations of lattice structures used by the system of FIG. 3.
Figure 5B:
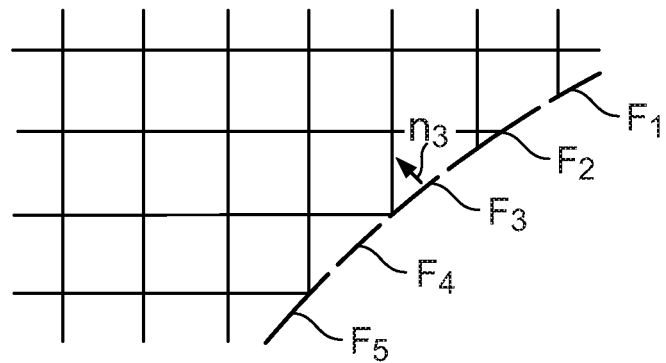

Referring to FIGS. 5A and 5B, a surface S (FIG. 3A) is represented in the simulation space (FIG. 5B) as a collection of facets (also referred to as surfels) $F_\alpha$:

$$S = \{F_\alpha\} \qquad \text{Eq.(7)}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
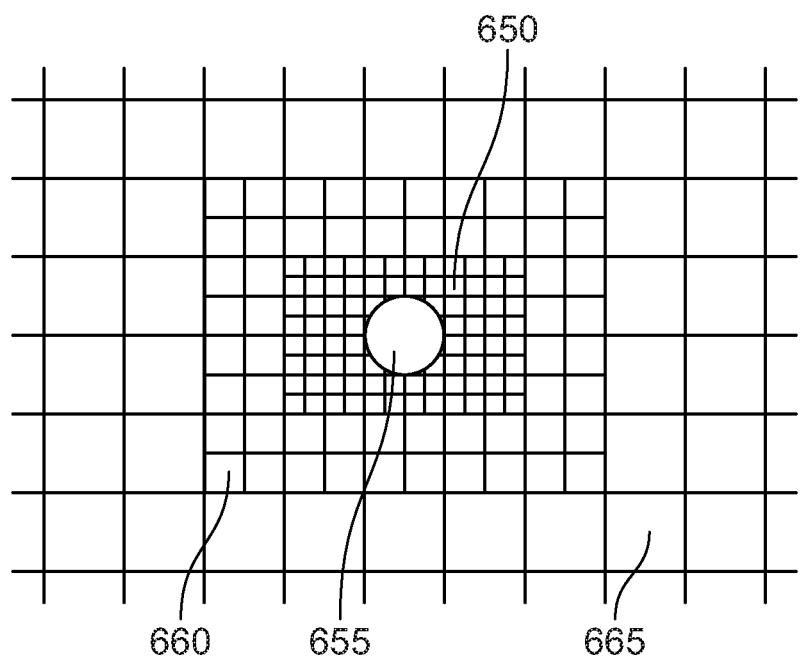
FIGS. 6 and 7 illustrate variable resolution techniques.
Figure 7:
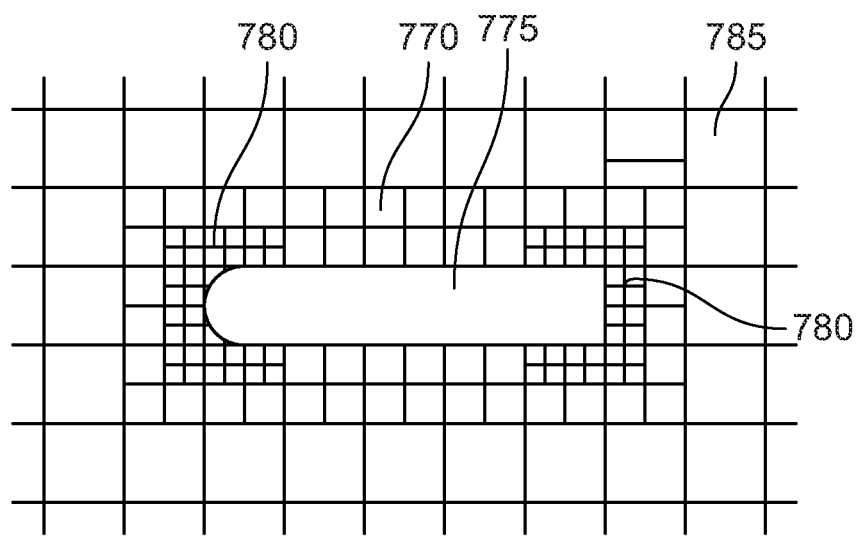

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected by Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
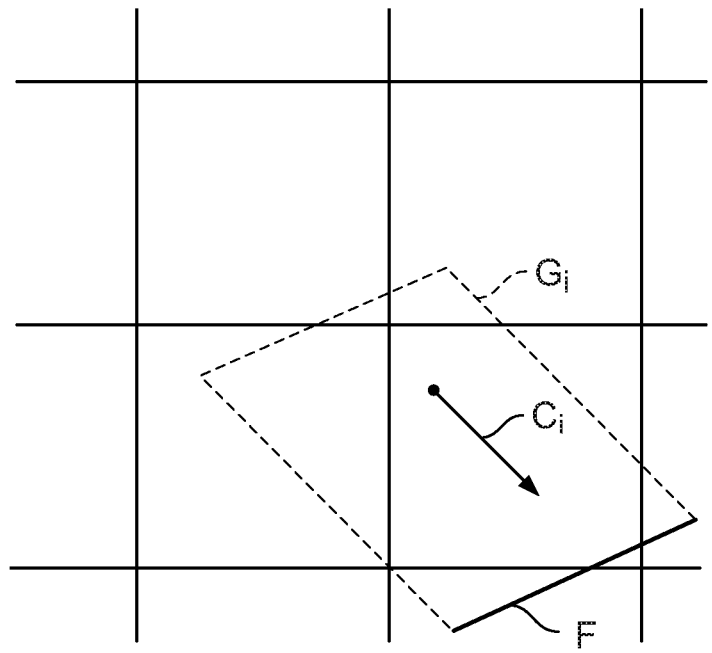
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha \qquad \text{Eq.(8)}$$

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel $N(x)$ overlapped by a parallelepiped $G_{i\alpha}$ is defined as $V_{i\alpha}(x)$. Using this term, the flux $\Gamma_{i\alpha}(x)$ of state i particles that move between a voxel $N(x)$ and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x)=N_i(x)V_{i\alpha}(x). \qquad \text{Eq.(9)}$$

When the parallelepiped $G_{i\alpha}$ is intersected by one or more facets, the following condition is true:

$$V_{i\alpha}=\Sigma V_\alpha(x)+\Sigma V_{i\alpha}(\beta) \qquad \text{Eq.(10)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha}=\Sigma V_{i\alpha}(x). \qquad \text{Eq.(11)}$$

D. Perform Simulation Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel $N(x)$ and a facet $F_\alpha$ is:

$$\Gamma_{i\alpha}(x)=N_i(x)V_{i\alpha}(x). \qquad \text{Eq.(12)}$$

From this, for each state i directed toward a facet $F_\alpha(c_i n_\alpha<0)$, the number of particles provided to the facet $F_\alpha$ by the voxels is:

$$\Gamma_{i\alpha V-F} = \sum_x \Gamma_{i\alpha}(x) = \sum_x N_i(x)V_{i\alpha}(x) \qquad \text{Eq. (13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 10:
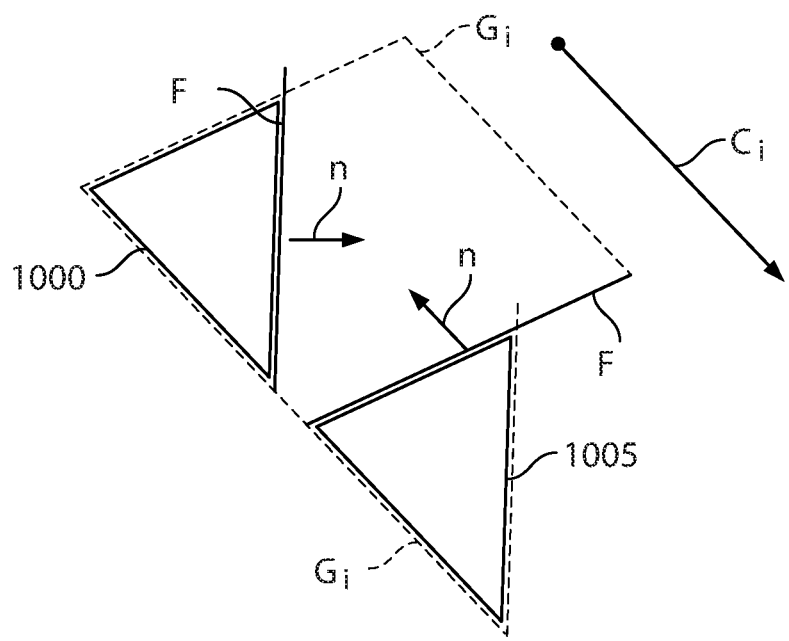
FIG. 10 illustrates movement of particles from a surface to a surface.

Next, particles are moved between facets (step 310). If the parallelepiped $G_{i\alpha}$ for an incoming state ($c_i n_\alpha<0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta,t-1)=\Gamma_i(\beta)V_{i\alpha}(\beta)/V_{i\alpha}, \qquad \text{Eq.(14)}$$

where $\Gamma_i(\beta,t-1)$ is a measure of the state i particles produced by the facet $F_\beta$ during the previous time increment. From this, for each state i directed toward a facet $F_\alpha$ ($c_i n_\alpha<0$), the number of particles provided to the facet $F_\alpha$ by the other facets is:

$$\Gamma_{i\alpha F-F} = \sum_\beta \Gamma_{i\alpha}(\beta) = \sum_\beta \Gamma_i(\beta, t-1)V_{i\alpha}(\beta)/V_{i\alpha} \qquad \text{Eq. (15)}$$

and the total flux of state i particles into the facet is:

$$\Gamma_{iIN}(\alpha) = \qquad \text{Eq. (16)}$$
$$\Gamma_{i\alpha V-F}+\Gamma_{i\alpha F-F} = \sum_x N_i(x)V_{i\alpha}(x) + \sum_\beta \Gamma_i(\beta, t-1)V_{i\alpha}(\beta)/V_{i\alpha}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha)=\Gamma_{iIN}(\alpha)/V_{i\alpha}, \qquad \text{Eq.(17)}$$

for $c_i \cdot n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha)=\Gamma_{iOTHER}(\alpha)/V \qquad \text{Eq.(18)}$$

for $c_i \cdot n_\alpha \geq 0$, wherein $\Gamma_{iOTHER}(\alpha)$ is determined using the technique described above for generating $\Gamma_{iIN}(\alpha)$, but applying the technique to states ($c_i \cdot n_\alpha \geq 0$) other than incoming states ($c_i \cdot n_\alpha < 0$). In an alternative approach, $\Gamma_{iOTHER}(\alpha)$ may be generated using values of $\Gamma_{iOUT}(\alpha)$ from the previous time step so that:

$$\Gamma_{iOTHER}(\alpha,t)=\Gamma_{iOUT}(\alpha,t-1). \qquad \text{Eq.(19)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
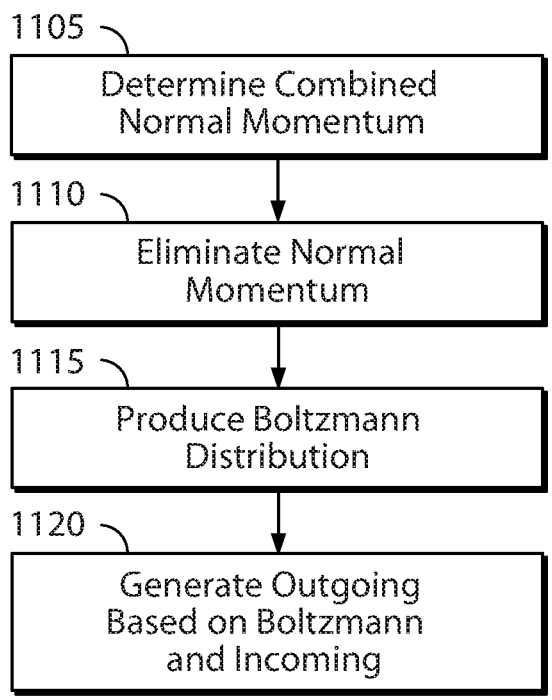
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum $P(\alpha)$ of the particles at the facet as:

$$P(\alpha) = \sum_i c_i * N_i^\alpha \qquad \text{Eq. (20)}$$

for all i. From this, the normal momentum $P_n(\alpha)$ is determined as:

$$P_n(\alpha)=n_a \cdot P(\alpha). \qquad \text{Eq.(21)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha)=\Gamma_{iIN}(\alpha)-N_{n-\beta i}(\alpha)V_{i\alpha}. \qquad \text{Eq.(22)}$$

Using this difference, the outgoing flux distribution is:

$$\Gamma_{iOUT}(\alpha)=N_{n-\beta i}(\alpha)V_{i\alpha}-\Delta\Gamma_{i^*}(\alpha), \qquad \text{Eq.(23)}$$

for $n_\alpha c_i > 0$ and where i* is the state having a direction opposite to state i. For example, if state i is (1, 1, 0, 0), then state i* is (−1, −1, 0, 0). To account for skin friction (also referred to as wall shear stress) and other factors, the outgoing flux distribution may be further refined to:

$$\Gamma_{iOUT}(\alpha)=N_{n-Bi}(\alpha)V_{i\alpha}-\Delta\Gamma_{i^*}(\alpha)+C_f(n_\alpha \cdot c_i)[N_{n-Bi^*}(\alpha)-N_{n-Bi}(\alpha)]V_{i\alpha}+(n_\alpha \cdot c_i)(t_{1\alpha} \cdot c_i)\Delta N_{j,1}V_{i\alpha}+(n_\alpha \cdot c_i)(t_{2\alpha} \cdot c_i)\Delta N_{j,2}V_{i\alpha} \qquad \text{Eq. (24)}$$

for $n_\alpha c_i > 0$, where $C_f$ is a function of skin friction (also referred to as wall shear stress), $t_{1\alpha}$ is a first tangential vector that is perpendicular to $n_\alpha$, $t_{2\alpha}$, is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \cdot \sum_i c_i c_i N_{n-Bi}(\alpha) \cdot t_{1,2\alpha}\right) \qquad \text{Eq. (25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha)=(P(\alpha)-P_n(\alpha)n_\alpha)/\rho, \qquad \text{Eq.(26)}$$

where $\rho$ is the density of the facet distribution:

$$\rho = \sum_i N_i(\alpha) \qquad \text{Eq. (27)}$$

As before, the difference between the incoming flux distribution and the Boltzmann distribution is determined as:

$$\Delta\Gamma_i(\alpha)=\Gamma_{iIN}(\alpha)-N_{n-\beta i}(\alpha)V_{i\alpha}. \qquad \text{Eq.(28)}$$

The outgoing flux distribution then becomes:

$$\Gamma_{iOUT}(\alpha)=N_{n-\beta i}(\alpha)V_{i\alpha}-\Delta\Gamma_{i^*}(\alpha)+C_f(n_\alpha c_i)[N_{n-\beta i^*}(\alpha)-N_{n-\beta i}(\alpha)]V_{i\alpha}, \qquad \text{Eq.(29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = p_\alpha n_\alpha A_\alpha - C_f p_\alpha u_\alpha A_\alpha \qquad \text{Eq. (30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta \Gamma_{\alpha m j} = \sum_{i,c_{ji}, n_\alpha < 0} \Gamma_{\alpha j i I N} - \sum_{i,c_{ji}, n_\alpha > 0} \Gamma_{\alpha j i O U T} \qquad \text{Eq. (31)}$$

where the index j denotes the energy of the state i. This energy difference is then used to generate a difference term:

$$\delta \Gamma_{\alpha j i} = V_{i\alpha} \Delta \Gamma_{\alpha m j} \Big/ \sum_{i,c_{ji}, n_\alpha < 0} V_{i\alpha} \qquad \text{Eq. (32)}$$

for $c_{ji} n_\alpha > 0$. This difference term is used to modify the outgoing flux so that the flux becomes:

$$\Gamma_{\alpha j i O U T f} = \Gamma_{\alpha j i O U T} + \delta \Gamma_{\alpha j i} \qquad \text{Eq.(33)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

Figure 9:
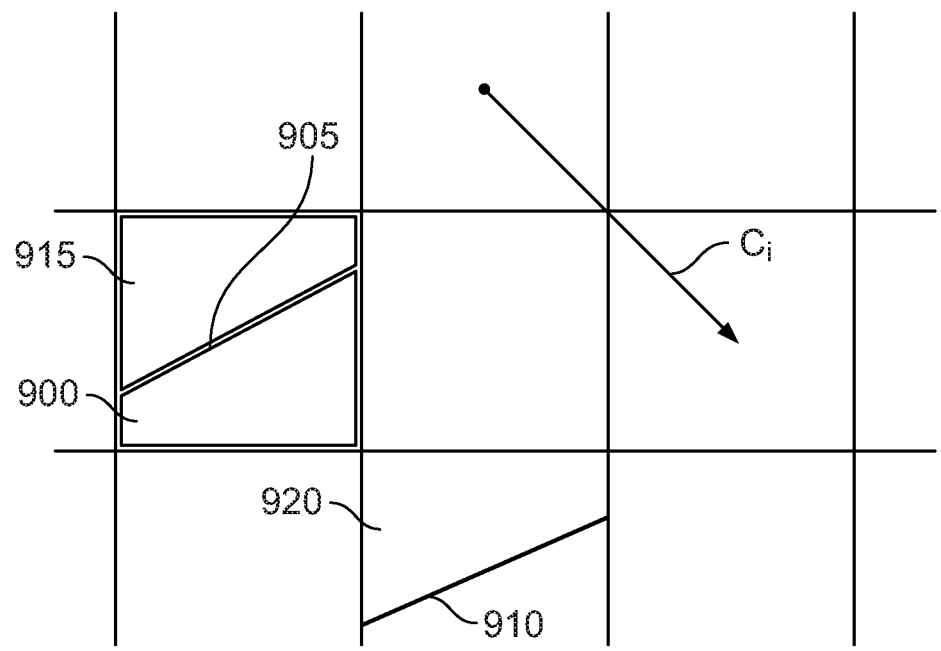
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \qquad \text{Eq. (34)}$$

where N(x) is the source voxel.

6. Scatter from Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha i F-V} = \frac{1}{P_f(x)} V_{\alpha i}(x) \Gamma_{\alpha i O U T f} / V_{\alpha i} \qquad \text{Eq. (35)}$$

where $P_f(x)$ accounts for the volume reduction of partial voxels. From this, for each state i, the total number of particles directed from the facets to a voxel $N_{(x)}$ is:

$$N_{i F-V} = \frac{1}{P_f(x)} \sum_\alpha V_{\alpha i}(x) \Gamma_{\alpha i O U T f} / V_{\alpha i} \qquad \text{Eq. (36)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set the weights, both are listed in Table 1, together with Equation 2 ensures that the macroscopic behavior obeys the correct hydrodynamic equation.

E. Variable Resolution

Figure 12:
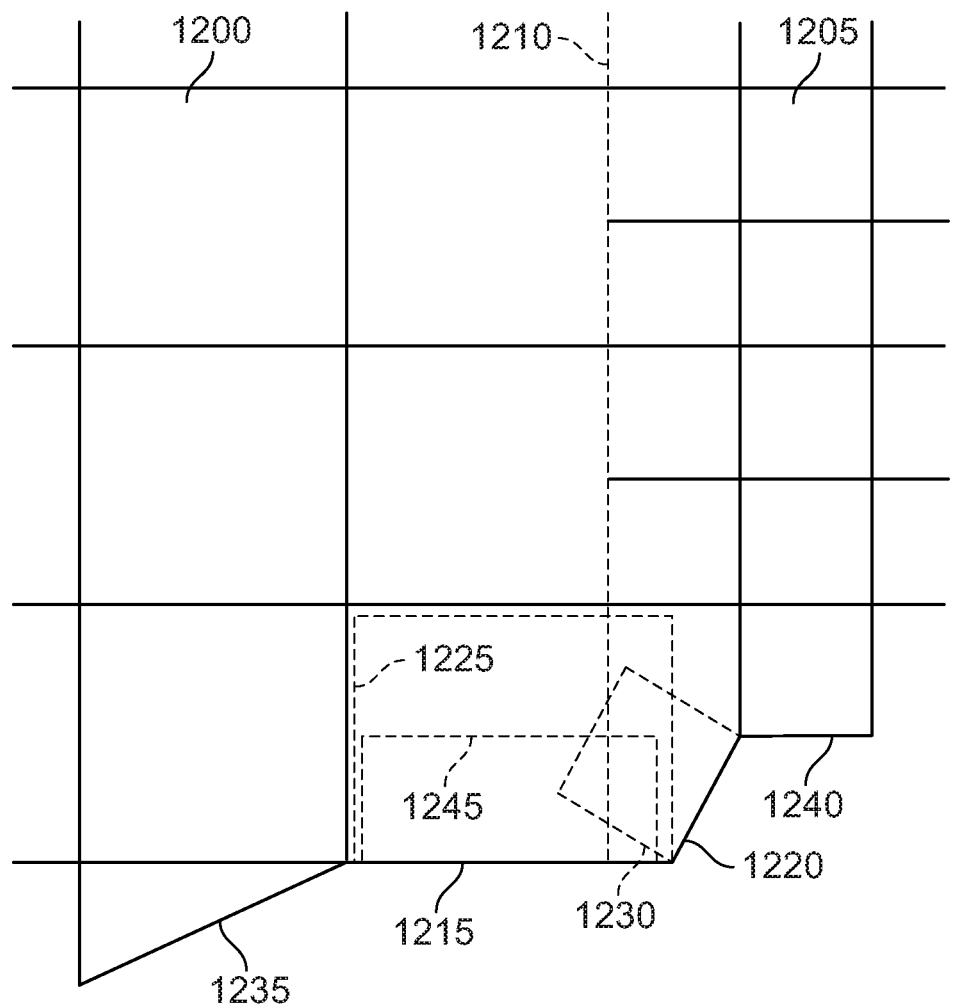
FIG. 12 illustrates an interface between voxels of different sizes.

Referring to FIG. 12, variable resolution (as illustrated in FIGS. 6 and 7 and discussed above) employs voxels of different sizes, hereinafter referred to as coarse voxels 12000 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha C}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Figure 13:
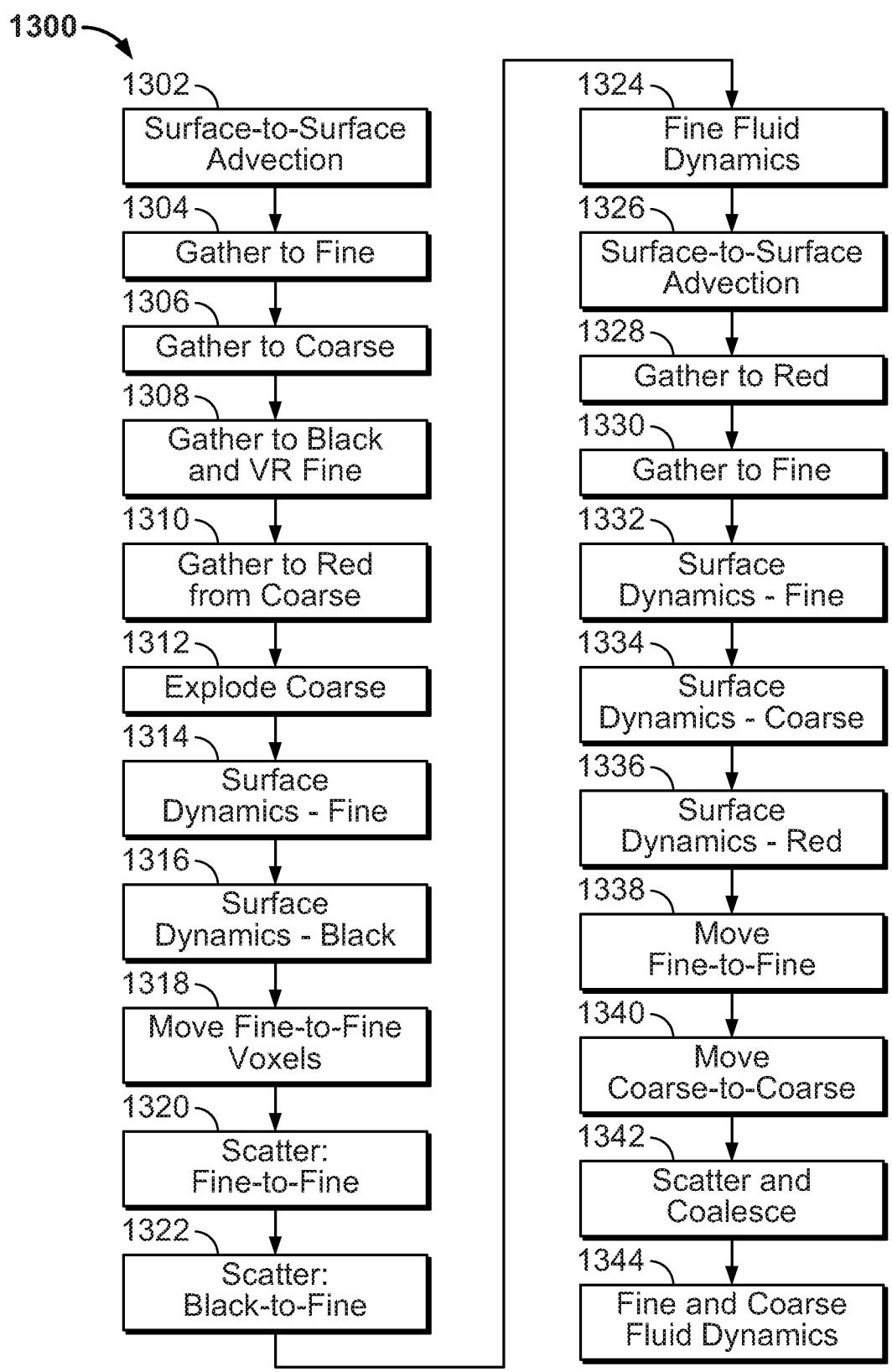
FIG. 13 is a flow chart of a procedure for simulating interactions with facets under variable resolution conditions.

Interactions with VR facets are handled using a variable resolution procedure 1300 illustrated in FIG. 13. Most steps of this procedure are carried out using the comparable steps discussed above for interactions with non-VR facets. The procedure 1300 is performed during a coarse time step (i.e., a time period corresponding to a coarse voxel) that includes two phases that each correspond to a fine time step. The facet surface dynamics are performed during each fine time step. For this reason, a VR interface facet Fax is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1302). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 12, 1225) that extends from a facet $F_\alpha$ and that lies behind a facet $F_\beta$ less the unblocked portion of the fine parallelepiped (FIG. 12, 1245) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha} = |c_i n_\alpha| A_\alpha. \qquad \text{Eq.(37)}$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha ICr}$ to black facets $F_{\beta ICb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha ICr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets $F_C$ with a weighting factor of $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1304-1310). Particles are gathered for fine facets $F_{\alpha F}$ from fine voxels using fine parallelepipeds (step 1304), and for coarse facets $F_{\alpha C}$ from coarse voxels using coarse parallelepipeds (step 1306). Particles are then gathered for black facets $F_{\alpha IRb}$ and for VR fine facets $F_{\alpha IF}$ from both coarse and fine voxels using fine parallelepipeds (step 1308). Finally, particles are gathered for red facets $F_{\alpha IRr}$ from coarse voxels using the differences between coarse parallelepipeds and fine parallelepipeds (step 1310).

Next, coarse voxels that interact with fine voxels or VR facets are exploded into a collection of fine voxels (step 1312). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 4. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1314), and for the black facets $F_{aJCb}$ (step 1316). Dynamics are performed using the procedure illustrated in FIG. 11 and discussed above.

Next, particles are moved between fine voxels (step 1318) including actual fine voxels and fine voxels resulting from the explosion of coarse voxels. Once the particles have been moved, particles are scattered from the fine facets $F_{aJF}$ and $F_{aF}$ to the fine voxels (step 1320).

Particles are also scattered from the black facets $F_{aJCb}$ to the fine voxels (including the fine voxels that result from exploding a coarse voxel) (step 1322). Particles are scattered to a fine voxel if the voxel would have received particles at that time absent the presence of a surface. In particular, particles are scattered to a voxel N(x) when the voxel is an actual fine voxel (as opposed to a fine voxel resulting from the explosion of a coarse voxel), when a voxel $N(x+c_i)$ that is one velocity unit beyond the voxel N(x) is an actual fine voxel, or when the voxel $N(x+c_i)$ that is one velocity unit beyond the voxel N(x) is a fine voxel resulting from the explosion of a coarse voxel.

Finally, the first fine time step is completed by performing fluid dynamics on the fine voxels (step 1324). The voxels for which fluid dynamics are performed do not include the fine voxels that result from exploding a coarse voxel (step 1312).

The procedure 1300 implements similar steps during the second fine time step. Initially, particles are moved between surfaces in a second surface-to-surface advection stage (step 1326). Particles are advected from black facets to red facets, from black facets to fine facets, from fine facets to red facets, and from fine facets to fine facets.

After particles are advected between surfaces, particles are gathered from the voxels in a second gather stage (steps 1328-1330). Particles are gathered for red facets $F_{aJRr}$ from fine voxels using fine parallelepipeds (step 1328). Particles also are gathered for fine facets $F_{aF}$ and $F_{aJF}$ from fine voxels using fine parallelepipeds (step 1330).

Thereafter, surface dynamics are performed for the fine facets $F_{aJF}$ and $F_{aF}$ (step 1332), for the coarse facets $F_{aC}$ (step 1134), and for the red facets $F_{aJCr}$ (step 1336) as discussed above.

Next, particles are moved between voxels using fine resolution (step 1338) so that particles are moved to and from fine voxels and fine voxels representative of coarse voxels. Particles are then moved between voxels using coarse resolution (step 1340) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1342). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1344).

G. Wall-Shear Stress Determination

As noted above, various types of LBM may be applied for solving fluid flows. Accurate prediction of high Reynolds number boundary layer flows over solid surfaces is of great significance in computational aerodynamics, for it determines the aero/hydrodynamic forces acting on a body moving in a fluid. One physical quantity affected by the boundary layer flow is the wall shear stress (i.e., skin friction), which in turn affects fundamental flow properties including but not limited to pressure distribution and fluctuations, flow separation and stall characteristics of fluid dynamic devices such as an aircraft wing or a ground vehicle. Thus, the fluid flow simulations rely in part on skin friction (also referred to as wall shear stress) to enforce a desired change in tangential momentum flux on the surface. The wall-shear stress at a particular location on the surface is affected by the fluid flow at the surface. For example, the wall-shear stress for regions of the surface exhibiting laminar flow is lower than the wall-shear stress for regions of the surface exhibiting turbulent flow. Due to this difference in wall-shear stress, it can be beneficial to predict the phenomena of laminar-to-turbulent transition in boundary layers and select an appropriate wall-shear stress value for regions (e.g., facets, surfels) on the surface based on the predicted laminar-to-turbulent transition.

In the systems and methods described herein, values for the wall shear stress are assigned on a per-facet (e.g., per-surfel) basis and re-determined at each time step during the fluid flow simulation. Wall shear stress is calculated and used in the dynamics for each surfel, rather than near wall voxels. More particularly, for each facet and each time step a determination is made as to whether the fluid flow at the surface location is laminar or turbulent. Based on the determination, a laminar wall shear stress value or a turbulent wall shear stress value is assigned to the facet and used during the fluid flow simulation. Once the shear stress is calculated for a surfel, the amount of tangentially reflected particles on that surfel can be determined. Note that the particle distribution in a near wall voxel (e.g., near a set of surfels) is influenced by the particles reflected from the nearby surfels.

Because of the existence of a high concentration of very small flow structures in the boundary layer, the one way to numerically solve the boundary layer flow is to apply sufficiently dense grid points near the wall to resolve these structures. This approach is computationally prohibitive and not feasible for most of the real world engineering problems involving very high Reynolds numbers flows and complex geometries. On the other hand, if the flow near a wall is considered as a fully developed turbulent boundary layer, then its overall velocity profile is well argued to satisfy a well known "universal" law of the wall. In fluid dynamics, the law of the wall states that the average velocity of a turbulent flow at a certain point is proportional to the logarithm of the distance from that point to the "wall", or the boundary of the fluid region. As a consequence, one may simply infer the value of the local wall-shear stress from such a velocity profile (in fact just from a single velocity value at some given distance from the wall) without directly computing the actual velocity distribution inside the boundary layer. By doing so the computational cost near the wall is significantly reduced. This indirect approach is robust and accurate as long as the flow near the wall is attached and is sufficiently developed as a turbulent boundary layer. Extensions have also been made to address flow separations on curved geometry via incorporation of pressure gradient effects, for example as described in U.S. Pat. No. 5,910,902 filed on Mar. 28, 1997 and entitled Computer Simulation of Physical Processes, the contents of which are hereby incorporated by reference. Modeling the physics of high Reynolds number boundary layer flows is commonly referred to as turbulent wall modeling. Using a wall model to predict turbulent skin-friction distribution is a common practice in the computational fluid dynamics (CFD) of high Reynolds number flows found in real world engineering applications.

Application of the universal law of the wall is valid and reliable if the flow everywhere in the boundary layer is fully turbulent and the boundary layer is developing under zero pressure gradient. In reality this condition is not always satisfied in a high Reynolds number wall-bounded flow. Indeed, close to the leading edges of fluid dynamic devices, the developing boundary layer flow is often not fully turbulent but rather laminar. This could be due to many reasons such as incoming flow properties and favorable pressure gradient effects. The main difference between a laminar boundary layer flow and a turbulent one is their resulting values of wall-shear stress. The former is significantly smaller compared to the latter under the same near-wall flow velocity value. As a consequence, a wall-shear stress value predicted from a wall model based on a fully developed turbulent boundary layer is likely to be significantly higher than the physically correct value when the boundary layer is not fully turbulent. The consequence on predicting global flow properties like lift and drag can be substantial, especially for streamlined bodies. Therefore, the methods and systems described herein identify where (and when) the flow is laminar or turbulent over solid surfaces.

One method for calculating the wall shear stress may include inferring the wall shear stress from its relationship with the near-wall fluid velocity, for example, according to the following:

$$U(y)=u_\tau f(y+) \qquad \text{Eq.(38)}$$

where $U(y)$ is the local fluid velocity value measured at y distance from the wall, $u_\tau$ is the friction velocity whose squared value $(u_\tau^2)$ is the wall shear stress, $f(y+)$ is the dimensionless fluid velocity profile defined in terms of y+, $y+=(y*u_\tau/v)$ is the dimensionless distance from the wall, and nu(v) is the fluid kinematic viscosity.

Rewriting to solve for the wall shear stress:

$$u_\tau^2=(U(y)/f(y+))^2$$

For y+>~15, the dimensionless fluid velocity profile $f(y+)$ is well known to be smaller for turbulent boundary layer flow than for a laminar boundary layer. As a result, for the same $U(y)$, the shear stress value is larger for a turbulent flow than for a laminar one.

Estimates of $f(y+)$, can be determined according to the following:

For a laminar boundary layer:

for all y+ values: $f(y+)=y+$

For a turbulent boundary layer:

for y+<10: $f(y+)=y+$ for y+>10: $f(y+)=(1/\kappa)*\ln(y+)+\beta$ \qquad Eq.(39)

where $\kappa$ is approximately 0.4 and $\beta$ is approximately 5. Thus, for y+>10, the estimate of $f(y+)$ follows the well-known "law of the wall."

Thus, the ratio of turbulent to laminar shear stress for the same $U(y)$ value can be found for a given y+ value. In some examples, the simulations of typical high Reynolds number flows, the near wall voxel size is typically chosen to give a y+ value on the order of 100. Using y+=100 as an example, the resulting turbulent to laminar f ratio is about 1/6 and hence the shear stress ratio is about 36.

The task of determining turbulent versus laminar flow can be difficult due to the overall difficulty of turbulence physics. In one typical attempt to determine whether a flow is laminar or turbulent, a model can be formulated based on two transport equations, one for intermittency and another for a transition onset criterion in terms of momentum thickness Reynolds number, e.g., as described in Langtry et al, Proceedings of ASME Turbo Expo 2004 entitled "A Correlation-Based Transition Model Using Local Variables". These transport equations form a framework for implementation of transition-related correlations based on freestream turbulence intensity and pressure gradient that is consistent with general purpose CFD methods. Transition from laminar to turbulent flow in the boundary layer was thus shown to be captured for certain benchmark flow cases. Unfortunately, this model requires integrating two additional partial differential equations (PDEs) in the flow field all the way to the wall (i.e., y+~1), besides having to compute the distance to the nearest wall at every point of the computational grid. This is not only exceedingly expensive computationally but also extremely inconvenient algorithmically in complex geometries.

Rather than making further extensions to the fluid turbulence model near wall (e.g., such as the extensions described in Langtry et al), the systems and methods described herein provide a generalized wall model for wall-shear stress that properly and automatically takes into account the laminar flow scenarios. As described above turbulent VLES model is believed to be largely adequate in predicting the dynamic behavior of turbulence. In general, as described herein, a VLES model includes modeling both in the fluid and at the wall. The wall model is based on the law of the wall described above, which is valid for a fully developed boundary layer flow in the absence of a pressure gradient. However in real flows there are pressure gradients, and the wall model can include an advanced boundary layer method scheme, which modifies the law of the wall to take into account the local pressure gradients. The fluid model accounts for the physical effects of turbulence through the eddy viscosity, which is partly determined by two PDE's), one governing the evolution of turbulent kinetic energy k and the other governing the evolution of turbulent dissipation epsilon. This type of k-epsilon model is commonly used, especially in Reynolds Averaged Navier Stokes (RANS) solvers. Our eddy viscosity formulation also includes a proprietary component based on local turbulent and mean flow characteristics and the Reynolds number, enabling accurate prediction of both the mean and time-varying properties of unsteady turbulent flows. Our VLES turbulence model also results in accurate prediction of the temporal and spatial distribution of the turbulent kinetic energy k, which is important for the new transition model scheme described herein.

In order for the model to accurately predict the dynamic behavior in non-turbulent regions, the definition of the wall-shear stress in the wall model needs to account for differences in wall-shear stress in laminar regions versus turbulent regions. The latter is constructed out of the law of the wall assumption for a fully developed turbulent boundary layer. In order to determine whether a region is laminar or turbulent, the models and systems described herein do not require solving a dedicated PDE for an additional flow property or using the lattice Boltzmann solver in an extremely thin near wall region. In addition, as described above the facet or surfel-based lattice Boltzmann boundary condition accurately and robustly defines the momentum flux tensor (including wall-shear stress) at the wall in arbitrary geometries, as long as the wall-shear stress value is prescribed (e.g. as described above in relation to equations (38-39)). Therefore, by appropriately assigning the wall-shear stress, there is no need to further enforce a condition on mesh resolution in the boundary layer at the wall. As such, the mesh resolution at the boundary layer at the wall can be the same as or similar to (e.g., within 10%) the mesh resolution in other regions of the simulated system.

Figure 14:
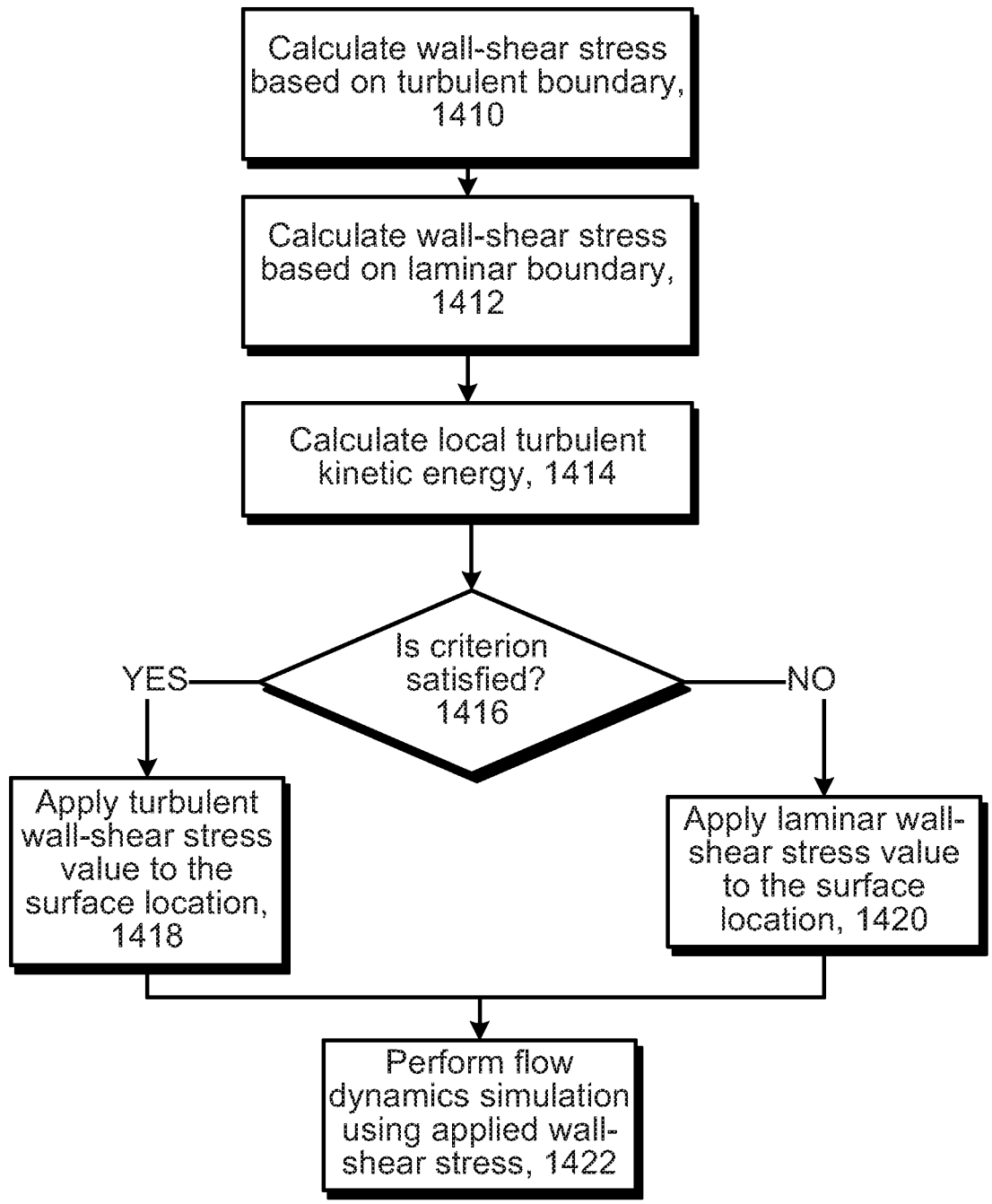
FIG. 14 is a flow chart of a procedure for assigning wall-shear stress values to each facet or surfel in the system, based on whether the flow is laminar or turbulent at the given location.

FIG. 14 illustrates a method for assigning wall-shear stress values to each facet or surfel in the system, based on whether the flow is laminar or turbulent at the given location. The method is iterated such that the wall-shear stress is determined and applied to each facet/surfel at each time step of the fluid flow simulation. As such, for a particular facet/surfel, the wall-shear stress may differ as a function of time based on whether the fluid flow at the particular location of the surface is laminar or turbulent at the time. Similarly, adjoining facets/surfels may have different values for the wall-shear stress in regions where the flow transitions from laminar to turbulent or from turbulent to laminar.

The method includes calculating two sets of characteristics, such as wall-shear stress values or other wall momentum flux tensor property values, for each and every local area of a solid surface (e.g., for each facet/surfel in the system). More particularly, in a simplistic example, a first wall shear-stress value is calculated based on an assumption of turbulent fluid flow in the system (1410). This calculation is based only on the fully developed turbulent boundary layer profile. Additionally, a second and independent wall-shear stress value is calculated based on the assumption of a laminar flow near the wall. The latter (i.e., the wall-shear stress value calculated based on a laminar flow assumption) has a substantially smaller wall-shear stress value than the former (i.e., the wall-shear stress value calculated based on a turbulent flow assumption) for a given near-wall fluid velocity value.

The actual wall-shear stress to be used in the flow dynamics simulation is chosen from either of the two different calculated wall-shear stress values depending on whether the local flow near wall is laminar or turbulent. Whether the flow is laminar or turbulent is determined by comparing a result from at least one of the first and second boundary layer calculations to a criterion. In one example, a key parameter entering this criterion is the level of local turbulence intensity (related to the value of turbulent kinetic energy). The turbulent kinetic energy value is higher for a turbulent flow than for a laminar flow. Thus, a criterion is based on whether the local turbulent kinetic energy level exceeds the value of another fundamental fluid quantity that is related to forcing at the wall that is given by a property based on the momentum flux tensor, e.g. the turbulent wall-shear stress. The method, therefore, includes comparing the turbulent kinetic energy with a measure of turbulent wall momentum flux tensor that is calculated under the assumption of turbulent flow regime near the wall. Furthermore, it is assumed that the near wall turbulence is fully developed and a criterion is applied to compare a measure of near-wall turbulent kinetic energy against this calculated measure of turbulent wall momentum flux tensor (1416). If the criterion is satisfied, then the flow at the given surface location is assumed to be turbulent and the method assigns/applies the calculated turbulent wall-shear stress value to the facet/surfel (1418). On the other hand, if the criterion is not satisfied, then the flow at the surface location is assumed to be laminar and the method assigns/applies the calculated laminar wall-shear stress value to the facet/surfel (1420). The method then performs flow dynamics simulation using the applied wall-shear stress (1422). This measure of the turbulence kinetic energy level is reasonable and desirable based on the following argument: it is known that in a fully developed turbulent boundary layer the turbulent kinetic energy is approximately constant inside the boundary layer and is proportional to the turbulent wall-shear stress by a constant factor (of order unity). Hence, one can apply this robust measure to identify if the flow is turbulent or not: it is turbulent if the turbulent kinetic energy level is greater or equal to that related to the wall-shear stress value, and is laminar otherwise.

Thus, in general, the systems and methods described herein not only determine laminar wall-shear stress values, but also automatically identify where on solid surfaces such a laminar wall-shear stress value is located and applied.

While in the example described above, the kinetic energy was compared to a threshold to determine whether the fluid flow is turbulent or laminar, in some examples, the local turbulence intensity can be used. The local turbulence intensity can be inferred from the turbulent kinetic energy value k combined with the local fluid velocity value. Either kinetic energy or turbulence intensity can be used in the methods and systems described herein.

While in the example described above, the applied wall-shear stress value was selected to be either the turbulent wall-shear stress value or the laminar wall shear stress value based on whether the local flow is laminar or turbulent, in some examples, the wall-shear stress to be used in the flow dynamics simulation is chosen from either the two different calculated wall-shear stress values or their combination depending on whether the local flow near wall is laminar or fully turbulent, or something in between.

As an example of such combination, when the local turbulent kinetic energy is close to a threshold value, a combined value of the laminar and turbulent shear stresses is used instead of selecting one or the other. This forms a "transitional" boundary layer that smoothes out the change in the wall model scheme in the vicinity of the threshold. This combined shear stress value could be determined in any desired way from the pure laminar and turbulent values, e.g., by applying weighting factors to the two wall-shear stress values. In one particular example, the following linearly weighted averaging procedure could be used:

$$u_{\tau\ trans}^2 = [u_{\tau\ lam}^2(k_2-k) + u_{\tau\ turb}^2(k-k_1)](k_2-k_1)^{-1},$$

where $u_{\tau\ trans}^2$ is the transitional wall shear stress value, $u_{\tau\ lam}^2$ is the pure laminar value, $u_{\tau\ turb}^2$ is the pure turbulent value, k is local turbulent kinetic energy, $k_1$ indicates the start of the transition range, and $k_2$ indicates the end of the transition range. A transitional ("in between") value would be used when the local turbulent kinetic energy value k is within some fraction of the threshold value, say within +/−10 percent. Using the variables defined above, this would imply $k_1$=0.9 $k_0$ and $k_2$=1.1 $k_0$, where $k_0$ is the "nominal" threshold value (which as noted previously is a constant times the local turbulent shear stress value for the present scheme).

A number of implementations have been described above. Nevertheless, it will be understood that various generalizations and extensions may be made without departing from the spirit and scope of the claims. For example, the methods described herein may be extended to include factors other than wall momentum flux tensor. As another example, the methods described herein may be extended to cover any situation in which several boundary layer calculations are performed with some being based on a laminar flow and the others based on a turbulent flow and the results from at least one of the calculation is compared to a threshold, while the result of this comparison is used to select the results of the laminar or turbulent boundary layer calculation to be used in simulation of a fluid flow. Examples of flow properties that could be used instead of or in addition to the wall-shear stress described in at least some of the examples above include, but are not limited to, various tensorially invariant properties of the wall momentum flux tensor including their spatial and temporal derivatives as well as locally and non-locally defined integral values of the related mean flow and turbulent properties. Also, our VLES model is but one possibility among the efficient vehicles for accurate determination of unsteady turbulent properties such as local turbulent kinetic energy. The following claims do not depend on using any particular model of turbulent flow, as long as it adequately and accurately describes the spatiotemporal distribution of flow properties. Accordingly, various other general and extended implementations are within the scope of the following claims.

What is claimed is:

1. A method for modifying a simulation of fluid flow activity on a computer, the method comprising:
   performing a first calculation where fluid flow at a local boundary layer is assumed to be a laminar fluid flow at the local boundary layer;
   performing a second calculation where the fluid flow at the local boundary layer is assumed to be a turbulent fluid flow at the local boundary layer; and
   modifying the simulation of the fluid flow activity based on a result from the first calculation, a result from the second calculation or a combination of the result of the first and the result of the second calculation.

2. The method of claim 1 wherein performing the first calculation, further comprises:
   selecting the results of the first calculation and the second calculation or the combination according to a criterion that is related to a level of local turbulence intensity.

3. The method of claim 1 wherein the first calculation comprises calculating a wall momentum flux tensor property for a laminar flow, the second calculation comprises calculating a wall momentum flux tensor property for a turbulent flow; and the method further comprises:
   selecting the laminar wall momentum flux tensor property or the turbulent wall momentum flux tensor property for modifying the simulation.

4. The method of claim 1, further comprising:
   determining a laminar to turbulent boundary layer transition by:
   determining, for each of multiple facets on a boundary surface, a first measure based on the first calculation and a second measure based on the second calculation; and
   classifying fluid flow for at least some of the multiple facets as laminar or turbulent by comparing at least one of the first and second measures to a criterion.

5. The method of claim 4, further comprising:
   selecting a wall momentum flux tensor property for laminar flow for facets of the multiple facets classified as laminar; and
   selecting a wall momentum flux tensor property for turbulent flow for facets of the multiple facets classified as turbulent.

6. The method of claim 4, wherein a result of the first calculation comprises a measure of laminar wall momentum flux tensor, a result of the second calculation comprises a measure of turbulent wall momentum flux tensor, and the criterion comprises a measure of turbulence intensity.

7. The method of claim 1, wherein: the first calculation provides a measure of laminar wall momentum flux tensor and the second calculation provides a measure of turbulent wall momentum flux tensor, with the method further comprising:

comparing, for each of multiple facets on the boundary surface, a calculated measure of turbulence intensity and the measure of turbulent wall momentum flux tensor; and
selecting, for at least some of the multiple facets on the boundary surface, one of the calculated turbulent wall momentum flux tensor and laminar wall momentum flux tensor, based on the comparison.

8. The method of claim 7, wherein comparing comprises:
   determining if the measure of turbulence intensity is greater than the measure of wall momentum flux tensor; and
   selecting comprises, for a particular facet:
   selecting either the turbulent wall momentum flux tensor if the measure of turbulence intensity is greater than the measure of turbulent wall momentum flux tensor or the measure of laminar wall momentum flux tensor if the measure of turbulence intensity is less than the measure of turbulent wall momentum flux tensor.

9. The method of claim 7, wherein for a given near-wall fluid velocity, the measure of turbulent wall momentum flux tensor is greater than the measure of laminar wall momentum flux tensor.

10. The method of claim 1, further comprising:
    calculating a value of local turbulent kinetic energy.

11. The method of claim 1, further comprises:
    simulating activity of fluid in a volume by:
    performing interaction operations on state vectors, the interaction operations modeling interactions between elements of different momentum states according to a model; and
    performing first move operations of the state vectors to reflect movement of elements to new voxels in the volume according to the model.

12. The method of claim 1 wherein the second calculation comprises a calculation to determine a measure of turbulent wall momentum flux tensor based on a velocity profile and a wall distance.

13. The method of claim 1, further comprising:
    selecting, for at least some of multiple facets on a boundary surface, a value that is based on a weighted average of a result of the first calculation and a result of the second calculation.

14. The method of claim 1, further comprising:
    selecting, for at least some of the multiple facets on the boundary surface, a wall momentum flux tensor property that is based on a combination of a turbulent wall momentum flux tensor property and a laminar wall momentum flux tensor property.

15. The method of claim 1 wherein the second calculation comprises a calculation to determine a measure of turbulent wall momentum flux tensor based on local turbulent kinetic energy and a local fluid velocity.

16. The method of claim 1 wherein a voxel size in a region adjacent to the boundary surface is similar to a voxel size at regions spaced apart from the boundary surface.

17. The method of claim 1 wherein a voxel size in a region adjacent to the boundary surface is the same as a voxel size at regions spaced apart from the boundary surface.

18. A memory device that is either a volatile or nonvolatile memory that stores executable computer instructions for modifying a simulation of fluid flow activity on a computer, the instructions being executable to cause the computer to:
    perform a first calculation where fluid flow at a local boundary layer is assumed to be a laminar fluid flow at the local boundary layer;

perform a second calculation where the fluid flow at the local boundary layer is assumed to be a turbulent fluid flow at the local boundary layer; and modify the simulation of the fluid flow activity based on the first calculation, the second calculation or a combination of the first and second calculations.

19. A computer system for modifying a simulation of fluid flow activity, comprising:
one or more processors devices;
memory coupled to the one or more processor devices; and
computer storage devices storing instructions that are executable by the one or more processors devices to cause the system to:
perform a first calculation where fluid flow at a local boundary layer is assumed to be a laminar fluid flow at the local boundary layer;
perform a second calculation where the fluid flow at the local boundary layer is assumed to be a turbulent fluid flow at the local boundary layer; and
modifying the simulation of fluid flow activity, based on the first calculation, the second calculation or a combination of the first and second calculations.

20. The computer system of claim 19, wherein the operations further comprise:
selecting the results of the first calculation and the second calculation or the combination according to a criterion that is related to a level of local turbulence intensity.

* * * * *